(12) United States Patent
Inagaki et al.

(10) Patent No.: US 12,351,240 B2
(45) Date of Patent: Jul. 8, 2025

(54) VEHICLE BODY SIDE STRUCTURE

(71) Applicant: HONDA MOTOR CO., LTD., Tokyo (JP)

(72) Inventors: Kenji Inagaki, Tokyo (JP); Takafumi Takayama, Tokyo (JP); Seiichi Kato, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 324 days.

(21) Appl. No.: 18/089,298

(22) Filed: Dec. 27, 2022

(65) Prior Publication Data

US 2023/0202582 A1  Jun. 29, 2023

(30) Foreign Application Priority Data

Dec. 28, 2021  (JP) ................................. 2021-214306

(51) Int. Cl.
| | |
|---|---|
| *B62D 25/04* | (2006.01) |
| *B62D 21/15* | (2006.01) |
| *B62D 25/02* | (2006.01) |
| *B62D 25/20* | (2006.01) |
| *B62D 27/02* | (2006.01) |

(52) U.S. Cl.
CPC ......... *B62D 21/157* (2013.01); *B62D 25/025* (2013.01); *B62D 25/04* (2013.01); *B62D 25/2036* (2013.01); *B62D 27/023* (2013.01)

(58) Field of Classification Search
CPC .. B62D 25/04; B62D 25/025; B62D 25/2036; B62D 27/023; B62D 21/157
USPC ................... 296/193.06, 187.12, 209, 29, 30
See application file for complete search history.

(56) References Cited

U.S. PATENT DOCUMENTS 5,042,872 A * 8/1991 Yoshii .................... B62D 25/04
296/203.02
9,809,258 B2 11/2017 Emura

FOREIGN PATENT DOCUMENTS

| JP | 2008189296 A | * 8/2008 |
|---|---|---|
| JP | 6054536 B2 | 12/2016 |

OTHER PUBLICATIONS

JP2008189296 Text (Year: 2008).*

* cited by examiner

*Primary Examiner* — Dennis H Pedder
(74) *Attorney, Agent, or Firm* — Rankin, Hill & Clark LLP

(57) ABSTRACT

The present invention provides a vehicle body side structure in which a center pillar (pillar) which extends upward from a side sill having a hollow cross section forms a closed cross section with a pillar inner thereof and a stiffener joined to an outer side in a vehicle-width direction of the pillar inner, and the stiffener has a protruding shape which protrudes outward in the vehicle-width direction, wherein the stiffener has an insertion portion into a cross section of the side sill, and has a fragile portion above the side sill.

17 Claims, 8 Drawing Sheets

FIG. 7C
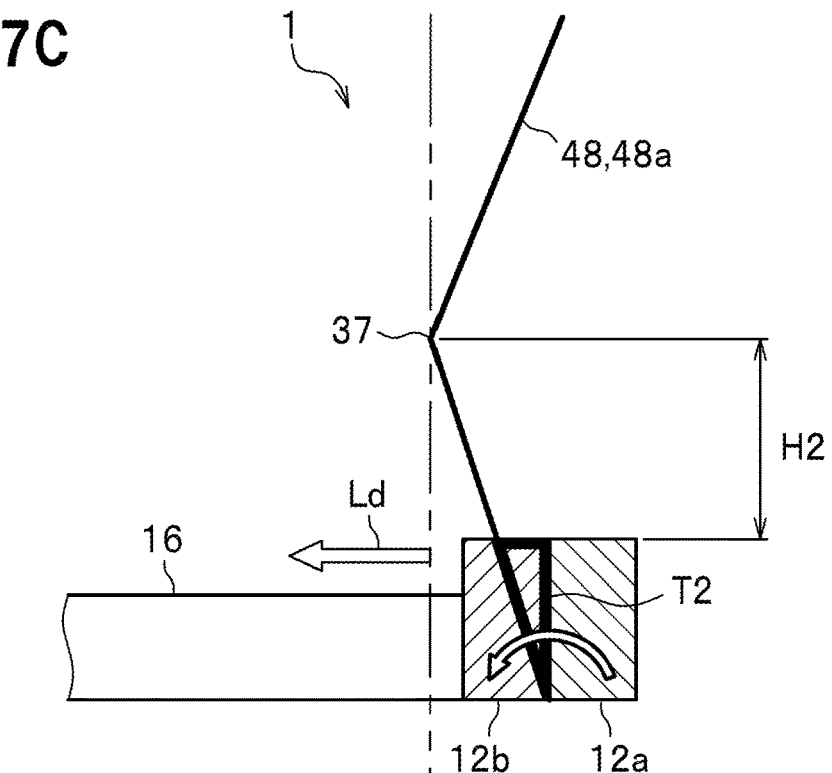
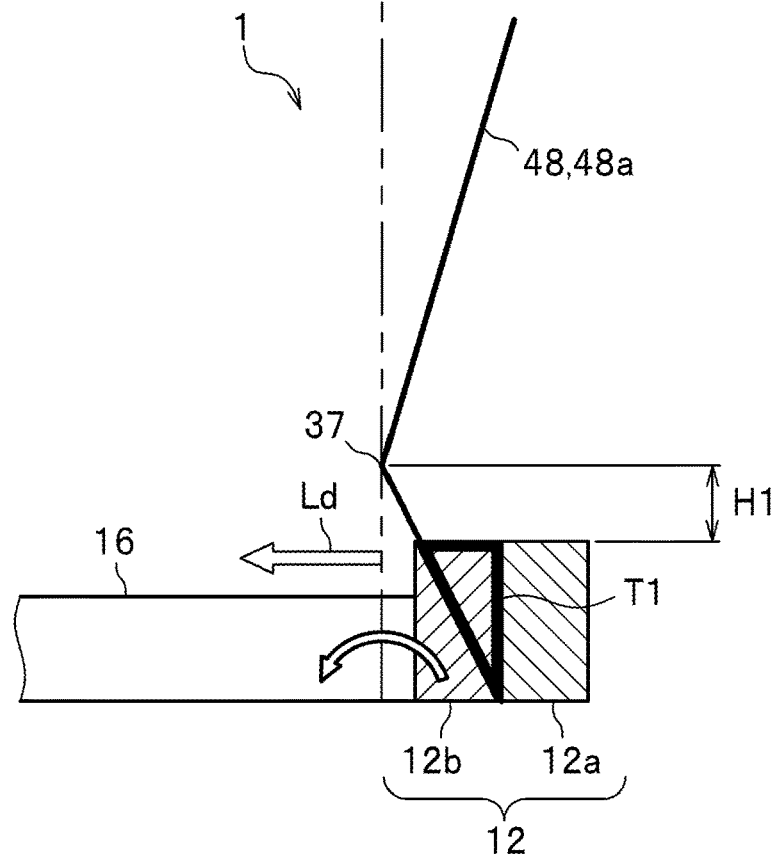

VEHICLE BODY SIDE STRUCTURE

BACKGROUND OF THE INVENTION

1. Field of the Invention

The present invention relates to a vehicle body side structure.

2. Description of the Related Art

A vehicle body side structure having a center pillar in which a lower end portion of a pillar inner formed of a plate extending upward from a side sill is joined to an extension extending in a top-bottom direction in a closed cross section of the side sill has been conventionally known (for example, see Patent Literature 1). According to such a vehicle body side structure, the rigidity of the side sill is enhanced by the extension and the joint strength between the pillar inner and the side sill is enhanced by joining the lower end portion of the pillar inner to the extension.

This allows the vehicle body side structure to absorb side collision load by bending and deforming the pillar inner to the vehicle inner side while suppressing breakage at the joint portion between the pillar inner and the side sill at the time of side collision.

PRIOR DOCUMENT(S)

Patent Literature(s)

Patent Literature 1: JP 6054536 B2

SUMMARY OF THE INVENTION

However, in the conventional vehicle body side structure (for example, see Patent Literature 1), it is also necessary to suppress entering of the pillar into the vehicle inner side in consideration of the safety of occupants at the time of side collision. Hence, there is a demand for a vehicle body side structure which can enhance the safety of occupants and can also sufficiently absorb side collision load at the time of side collision.

An object of the present invention is to provide a vehicle body side structure which is capable of sufficiently absorbing side collision load while suppressing the amount of deformation of the pillar to the vehicle inner side at the time of side collision in order to enhance the safety of traffic.

A vehicle body side structure of the present invention which has achieved the above-described object is a vehicle body side structure in which a pillar which extends upward from a side sill having a hollow cross section forms a closed cross section with a pillar inner thereof and a stiffener joined to an outer side in a vehicle-width direction of the pillar inner, and the stiffener has a protruding shape which protrudes outward in the vehicle-width direction, wherein the stiffener has an insertion portion into a cross section of the side sill, and has a fragile portion above the side sill.

The present invention makes it possible to provide a vehicle body side structure which is capable of sufficiently absorbing side collision load while suppressing the amount of deformation of the pillar to the vehicle inner side at the time of side collision in order to enhance the safety of traffic.

BRIEF DESCRIPTION OF THE DRAWINGS

FIG. 7C is an operation explanatory diagram of the vehicle body side structure according to the embodiment in conformity to the height of a fragile portion.

DETAILED DESCRIPTION OF THE EMBODIMENTS

Next, a mode for implementing the vehicle body side structure of the present invention (embodiment) is described in detail with reference to the drawings as appropriate. Note that the directions of arrows of front, rear, upper, lower, left, and right comply with the front, rear, upper, lower, left, and right directions of the vehicle body. In addition, in the following description, the left-right direction of the vehicle body is sometimes referred to as a vehicle-width direction.

The vehicle body side structure of the present embodiment is mainly characterized in that a lower end portion of a stiffener, which is arranged on the vehicle outer side relative to a pillar inner, is inserted into a hollow cross section of a side sill, and has a fragile portion above the side sill.

Hereinafter, regarding the vehicle body side structure of the present embodiment, although a center pillar (B pillar) is described as an example, the vehicle body side structure of the present embodiment can be applied to not only the center pillar but also any other pillar as long as the pillar extends upward from a side sill.

The vehicle body side structure of the present embodiment is disposed on each of the right and left sides of the vehicle body corresponding to the right and left center pillars. These right and left vehicle body side structures are symmetric to each other. Hence, in the present embodiment, only the left vehicle body side structure is described, and the detailed description of the right vehicle body side structure is omitted.

Hereinafter, the entire configuration of the vehicle body is first described, and then the vehicle body side structure of the present embodiment is described in detail.

<Entire Configuration of Vehicle Body>

Figure 1:
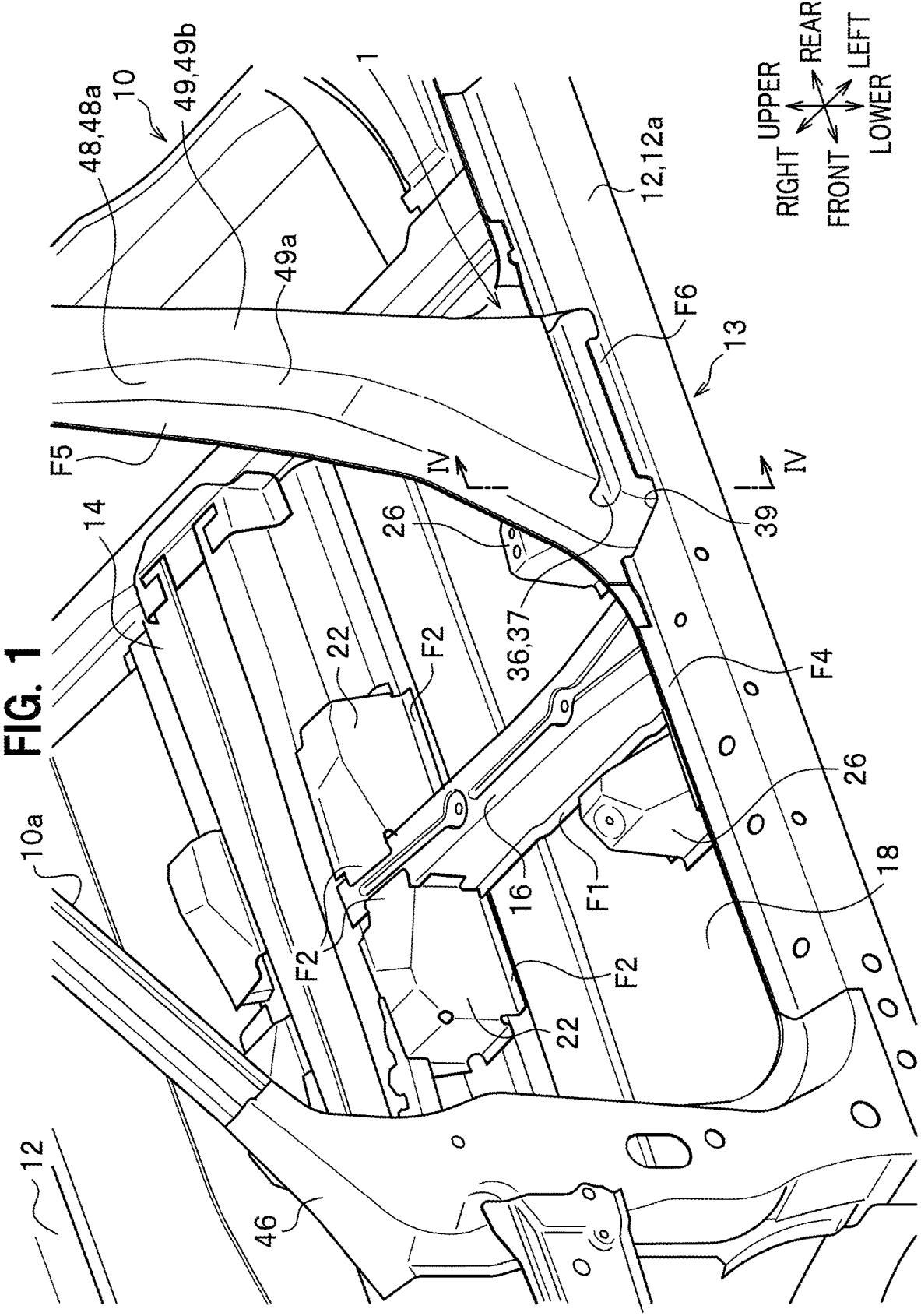
FIG. 1 is a partially expanded perspective view of a vehicle body having a vehicle body side structure according to an embodiment of the present invention.
Figure 2:
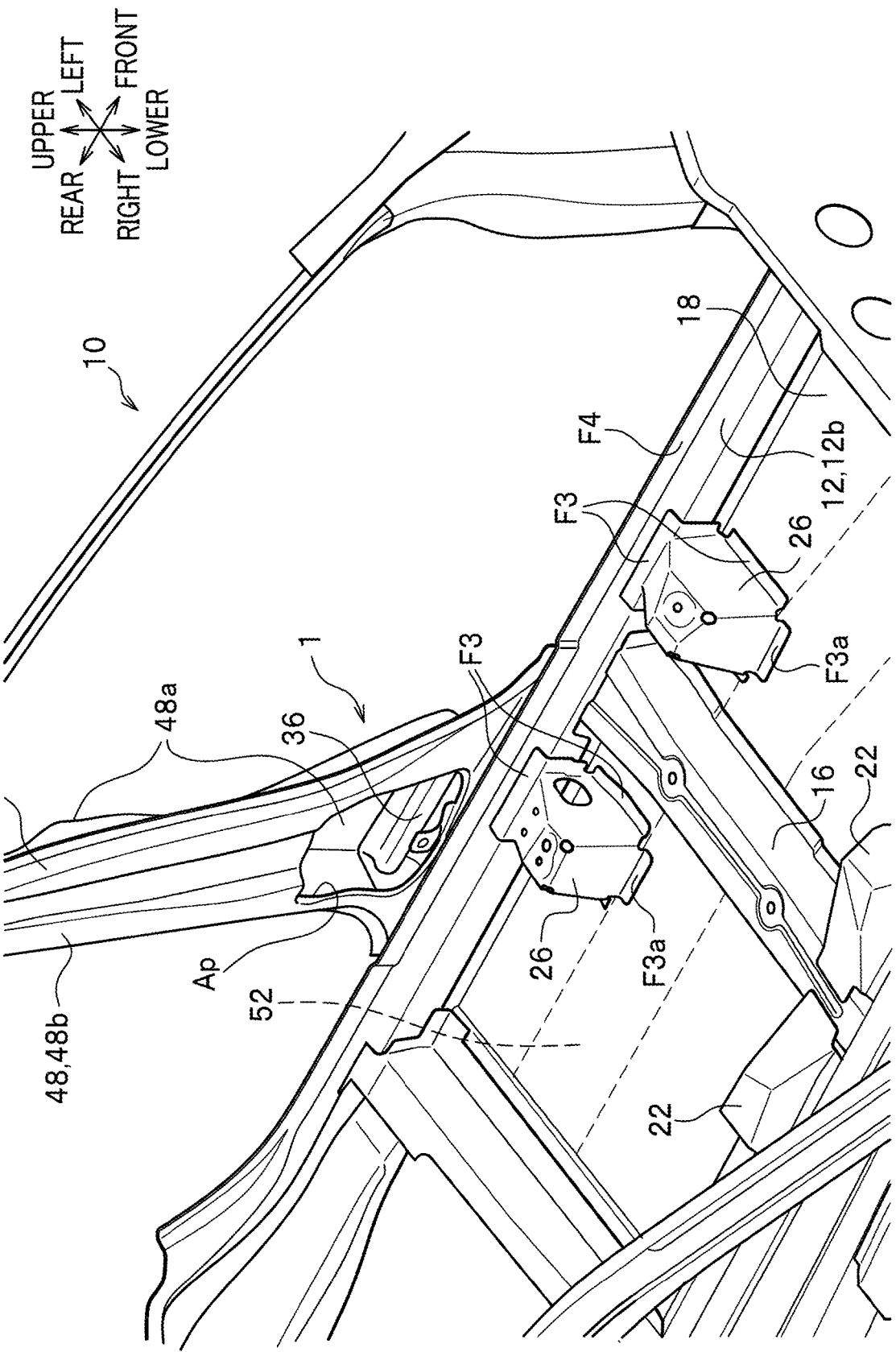
FIG. 2 is a partially expanded perspective view of the vehicle body of FIG. 1 as viewed from the vehicle inner side.

FIG. 1 is a partially expanded perspective view of a vehicle body 10 having a vehicle body side structure 1 according to the present embodiment. FIG. 2 is a partially expanded perspective view of the vehicle body 10 of FIG. 1 as viewed from the vehicle inner side.

As shown in FIG. 1, the vehicle body 10 includes a pair of right and left side sills 12 which extend in the front-rear direction on the outer side in the vehicle-width direction, front pillars 46 which extend upward from the front end portions of the side sills 12 (the front pillar on the right side is not shown in FIG. 1), center pillars 48 which extend upward from the center portions of the side sills 12 in the front-rear direction (the center pillar on the right side is not shown in FIG. 1), and rear pillars, which extend upward from the rear end portions of the side sills 12 although not shown. Note that the front pillar 46 is inclined in such a manner as to displace gradually rearward in the middle of extending upward from the side sill 12, and is connected at the extended front end to a roof side rail which is not shown. In addition, the upper end portion of the center pillar 48 and the upper end portion of the rear pillar (not shown) are connected to the roof side rail extending rearward.

In addition, as shown in FIG. 1, the vehicle body 10 includes a floor tunnel 14 which extends in the front-rear direction while partially bulging upward in a middle in the vehicle-width direction, a front floor panel 18 (hereinafter simply referred to as a floor panel 18) which is formed integrally with this floor tunnel 14 and extends outward in the vehicle-width direction to be connected to the side sills 12, and a floor cross member 16 which extends on the floor panel 18 in the vehicle-width direction and couples the side sills 12 and the floor tunnel 14.

The floor cross member 16 has a hat shape in a cross-sectional view intersecting the direction of extension thereof. The floor cross member 16 is welded to the floor panel 18 at flanges F1 formed to correspond to the flange portions of the hat shape by spot welding or the like.

Note that the floor cross member 16 in the present embodiment is such that one of a pair of floor cross members which are generally arranged in parallel on the front and rear sides on the floor panel 18 is omitted. In this way, the weight of the vehicle body 10 in the present embodiment is reduced by this omitted floor cross member. Note that in general, mounts for seat brackets for the front seats are formed in a pair of front and rear floor cross members arranged in parallel.

In addition, as shown in FIG. 1, the vehicle body 10 includes a pair of first seat brackets 22 which are arranged in such a manner as to sandwich the floor cross member 16 from the front and rear sides at positions adjacent to the floor tunnel 14.

Each first seat bracket 22 is formed of box which is rectangular in a plan view, and forms a closed space with a side face of the floor tunnel 14, an upper face of the floor panel 18, and a side face of the floor cross member 16.

The first seat brackets 22 in the present embodiment are assumed to be joined to the floor tunnel 14, the floor cross member 16, and the floor panel 18 with flanges F2 interposed in between by spot welding or the like. However, the method for joining the first seat brackets 22 is not limited to this, and may be mechanical joining using fasteners.

Such first seat brackets 22 in the present embodiment are formed of plates to reduce in weight, and are directly joined to main skeletons forming the vehicle body frame to achieve higher strength.

As shown in FIG. 2, the vehicle body 10 includes a pair of second seat brackets 26 which are arranged in such a manner as to sandwich the floor cross member 16 from the front and rear sides at positions adjacent to the side sill 12. These second seat brackets 26 are formed of boxes which are rectangular in the plan view and which are arranged side by side with respect to the pair of first seat brackets 22 in the vehicle-width direction. Note that the second seat brackets 26 correspond to a "seat bracket" defined in Claims.

However, each of the second seat brackets 26 is arranged with a predetermined gap with the floor cross member 16 unlike the first seat brackets 22. That is, the second seat brackets 26 form a closed space with the side face of the side sill 12 and the upper face of the floor panel 18.

Such second seat brackets 26 are assumed to be joined to the side sill 12 and the floor panel 18 with flanges F3 interposed in between by spot welding or the like. In addition, the second seat brackets 26 are also joined to a floor frame 52.

This floor frame 52 is arranged in such a manner as to extend between the side sill 12 and the floor tunnel 14 in the front-rear direction at the back face (lower face) side of the floor panel 18 as indicated by hidden outlines (dotted lines) in FIG. 2.

Although not shown, this floor frame 52 has a hat shape open upward in the cross-sectional view intersecting the direction of extension. In addition, the floor frame 52 is joined to the floor panel 18 with flanges interposed in between, which correspond to the flange portions of the hat shape, by spot welding or the like.

The flanges F3a of the second seat brackets 26 are welded to be joined with the floor panel 18 and flanges (not shown) of the floor frame 52 in three layers. In other words, the second seat brackets 26 are coupled to the floor cross member 16 with the floor frame 52 and the floor panel 18 interposed in between.

The method for joining such second seat brackets 26 is not limited to welding as in the case of the aforementioned first seat brackets 22.

Such second seat brackets 26 in the present embodiment are formed more compactly than the first seat brackets 22 to further reduce in weight, and are directly joined to the main skeleton forming the vehicle body frame to achieve higher rigidity.

Note that to the above-described pair of first seat brackets 22, a rail-slider assembly (not shown) on the right side which is provided in a lower portion of a passenger's seat (not shown) on the left side of the front seats is attached. In addition, to the pair of second seat brackets 26, a rail-slider assembly (not shown) on the left side which is provided in the lower portion of the passenger's seat (not shown) on the left side of the front seats is attached.

<Vehicle Body Side Structure>

Next, the vehicle body side structure 1 of the present embodiment (see FIG. 1) is described.

As shown in FIG. 1, the vehicle body side structure 1 of the present embodiment includes the side sill 12 and the center pillar 48 which extend upward from the side sill 12.

As shown in FIG. 1 and FIG. 2, the side sill 12 includes a side sill inner 12b (see FIG. 2) and a side sill stiffener 12a (see FIG. 1) which is arranged outside the side sill inner 12b in the vehicle-width direction.

The side sill inner 12b shown in FIG. 2 has a hat shape open outward in the vehicle-width direction (on the left side in FIG. 2) in the cross-sectional view intersecting the direction of extension thereof as described later. In addition, the side sill stiffener 12a shown in FIG. 1 has a hat shape open inward in the vehicle-width direction (on the right side in FIG. 1) as described later. In addition, the side sill 12 is such that flanges F4 on the upper side and flanges F7 (see FIG. 4) on the lower side, which are described later, in the side sill inner 12b (see FIG. 2) and the side sill stiffener 12a (see FIG. 1) are joined together, except for an insertion portion 13 into which a stiffener 48a of the center pillar 48, which is described later, is inserted, to form a closed cross section.

Here, before the side sill 12 is described in detail, the center pillar 48 having the stiffener 48a (see FIG. 1), which is inserted into the cross section of the side sill 12, is first described.

As shown in FIG. 1 and FIG. 2, the center pillar 48 in the present embodiment has a pillar inner 48b (see FIG. 2) which extends upward from the side sill 12 and a stiffener 48a (see FIG. 1 and FIG. 2) which is arranged outside the pillar inner 48b in the vehicle-width direction.

As shown in FIG. 2, the pillar inner 48b gradually becomes wider in width in the front-rear direction as extending from top to bottom. In addition, each of the front edge and the rear edge of the pillar inner 48b extends in a direction along the upper face of the side sill 12 to draw gentle curve denting downward as coming closer to the joint portion with the side sill 12.

Such a pillar inner 48b is formed of a substantially plate-shaped member, and has a lower end portion connected to the side sill inner 12b as described later. In addition, both end portions of the pillar inner 48b in the front-rear direction are sandwiched between and connected to the flange F4 (see FIG. 1) on the upper side of the side sill stiffener 12a (see FIG. 1) and the flange F4 (see FIG. 2) on the upper side of the side sill inner 12b (see FIG. 2) in three layers by welding or the like.

In FIG. 2, reference sign Ap indicates an aperture formed in a lower end portion of the pillar inner 48b, to which a seat belt locking device 5 (see FIG. 6), which is described later, is attached.

As shown in FIG. 1 and FIG. 2, the stiffener 48a has a flat shape substantially identical to the pillar inner 48b in aside view of the center pillar 48.

In addition, as shown in FIG. 1, the stiffener 48a has a protruding shape that protrudes outward in the vehicle-width direction (on the left side in FIG. 1). Specifically, the stiffener 48a has a hat shape in the cross-sectional view intersecting the direction of extension. That is, the stiffener 48a has flanges F5, which are provided respectively on the front edge and the rear edge (in FIG. 1, the flange on the rear side is not shown), and a bulging portion 49, which is formed between the flanges F5 and bulges outward in the vehicle-width direction.

The flanges F5 (see FIG. 1) of the stiffener 48a (see FIG. 1) placed on the pillar inner 48b (see FIG. 2) is joined to the pillar inner 48b by spot welding or the like, so that a closed cross section is formed inside the center pillar 48.

Note that a front wall 49a of the bulging portion 49 forms a rear portion of a door opening 10a. In addition, an outer wall 49b of the bulging portion 49 corresponding to the top portion of the hat shape is formed in a face portion substantially flat in the top-bottom direction and the front-rear direction.

As shown in FIG. 2, in such a stiffener 48a, a bead portion 36 which protrudes inward in the vehicle-width direction (on the vehicle inner side) is formed. This bead portion 36 is formed to extend in the front-rear direction. As shown in FIG. 1, this bead portion 36 appears as a groove portion crossing the bulging portion 49 in the front-rear direction on the outer side in the vehicle-width direction (on the vehicle outer side).

The bead portion 36 in the present embodiment is provided adjacent to an upper side of the side sill 12, and forms a fragile portion 37 of the stiffener 48a.

Figure 3:
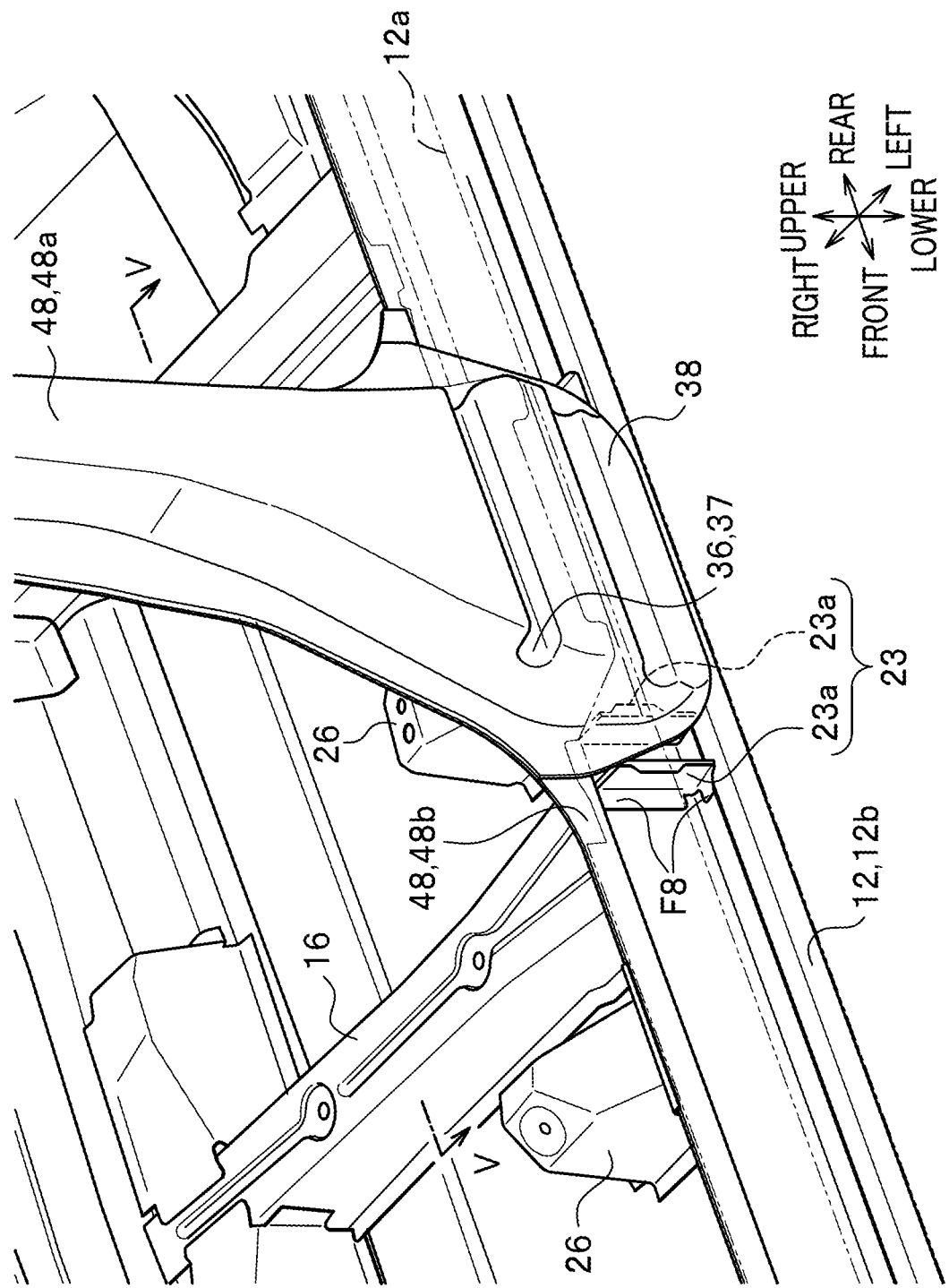
FIG. 3 is a partially expanded perspective view showing the vicinity of a lower end portion of a stiffener in a center pillar where a side sill stiffener is removed from a side sill.

FIG. 3 is a partially expanded perspective view showing the vicinity of the lower end portion of the stiffener 48a in the center pillar 48 where the side sill stiffener 12a is removed from the side sill 12. Note that in FIG. 3, the side sill stiffener 12a is indicated by an imaginary line (dashed-two dotted line).

As shown in FIG. 3, the lower end portion of the stiffener 48a has a reversed isosceles trapezoidal shape in a side view as viewed from the outer side in the vehicle-width direction (on the vehicle outer side). In other words, the lower end portion of the stiffener 48a gradually becomes narrower in width in the front-rear direction as extending downward away from the lower end portion side of the pillar inner 48b.

Such a lower end portion of the stiffener 48a forms an insertion portion 38 which is arranged inside the cross section of the side sill 12.

The insertion portion 38 is arranged at a position overlapping the floor cross member 16 in the vehicle front-rear direction.

Note that in FIG. 3, reference sign 23 indicates a later-described first bulkhead which is arranged at a position overlapping the front portion in the lower end portion (insertion portion 38) of the stiffener 48a in the vehicle front-rear direction.

Figure 4:
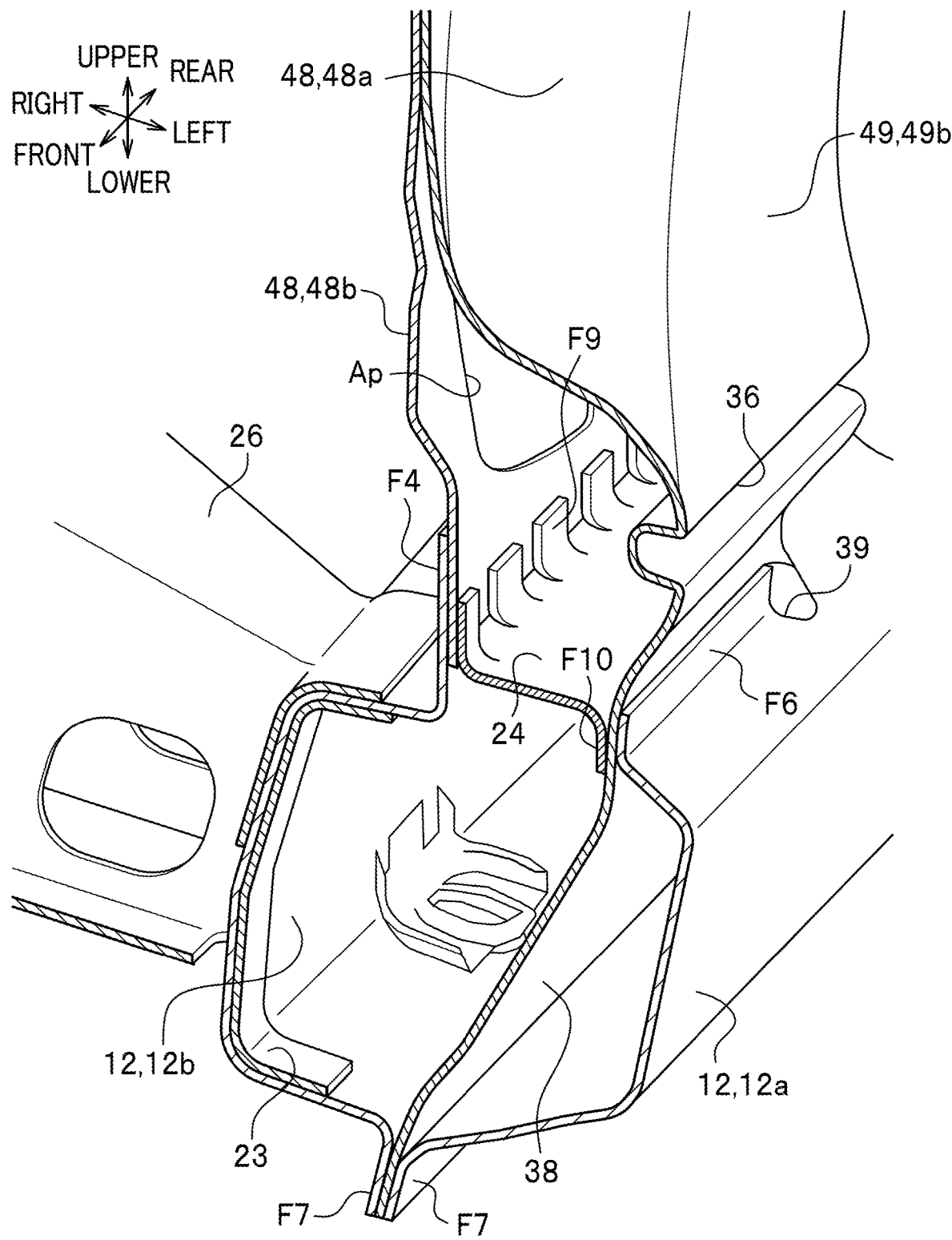
FIG. 4 is a IV-IV cross-sectional view of FIG. 1.

FIG. 4 is a IV-IV cross-sectional view of FIG. 1. This IV-IV cross section corresponds to a vertical cross section in the insertion portion 13 shown in FIG. 1.

As shown in FIG. 4, in the side sill stiffener 12a of the side sill 12, a cut-out 39 into which the stiffener 48a of the center pillar 48 is inserted is formed.

As shown in FIG. 1, this cut-out 39 is formed to correspond to the bulging portion 49 of the stiffener 48a.

On the edge portion of the cut-out 39 on the vehicle outer side, a flange F6 formed by using a cut and raised portion of the cut-out 39 is formed.

As shown in FIG. 4, this flange F6 is arranged along the outer wall 49b of the bulging portion 49. Note that the flange F6 is joined such that the stiffener 48a is sandwiched between the flange F6 and a flange F10 of a second bulkhead 24 in three layers by spot welding or the like as described later.

On the other hand, the lower end portion of the pillar inner 48b in the center pillar 48 is sandwiched between and joined to the flange F4 on the upper side of the side sill inner 12b and a flange F9 of the second bulkhead 24, which is described later, in three layers by spot welding or the like.

That is, the center pillar 48 forms a closed cross section between the pillar inner 48b and the stiffener 48a with the portions extending upward from the side sill 12.

In addition, as shown in FIG. 4, the stiffener 48a is arranged such that a front end thereof extending downward in the hollow cross section of the side sill 12 through the cut-out 39 is sandwiched between the flange F7 on the lower side of the side sill inner 12b and the flange F7 on the lower side of the side sill stiffener 12a.

The stiffener 48a sandwiched between the flanges F7 is joined in three layers by spot welding or the like.

Note that in FIG. 4, reference sign 26 indicates a part of the second seat bracket 26 on the rear side among the pair of second seat brackets 26. Reference sign 23 indicates a part of the first bulkhead, which is described next. Reference sign 36 indicates the bead portion.

As shown in FIG. 3, the first bulkhead 23 is formed to have a pair of front and rear partition walls 23a. Note that in FIG. 3, the rear partition wall 23a, which overlaps the lower end portion of the stiffener 48a in the vehicle body front-rear direction, is indicated by using a hidden outline (dotted line).

Such a first bulkhead 23 is joined to the inner wall of the side sill inner 12b and the inner side wall in the vehicle-width direction in the lower end portion of the stiffener 48*a* with flanges F8 interposed in between by spot welding or the like.

Figure 5:
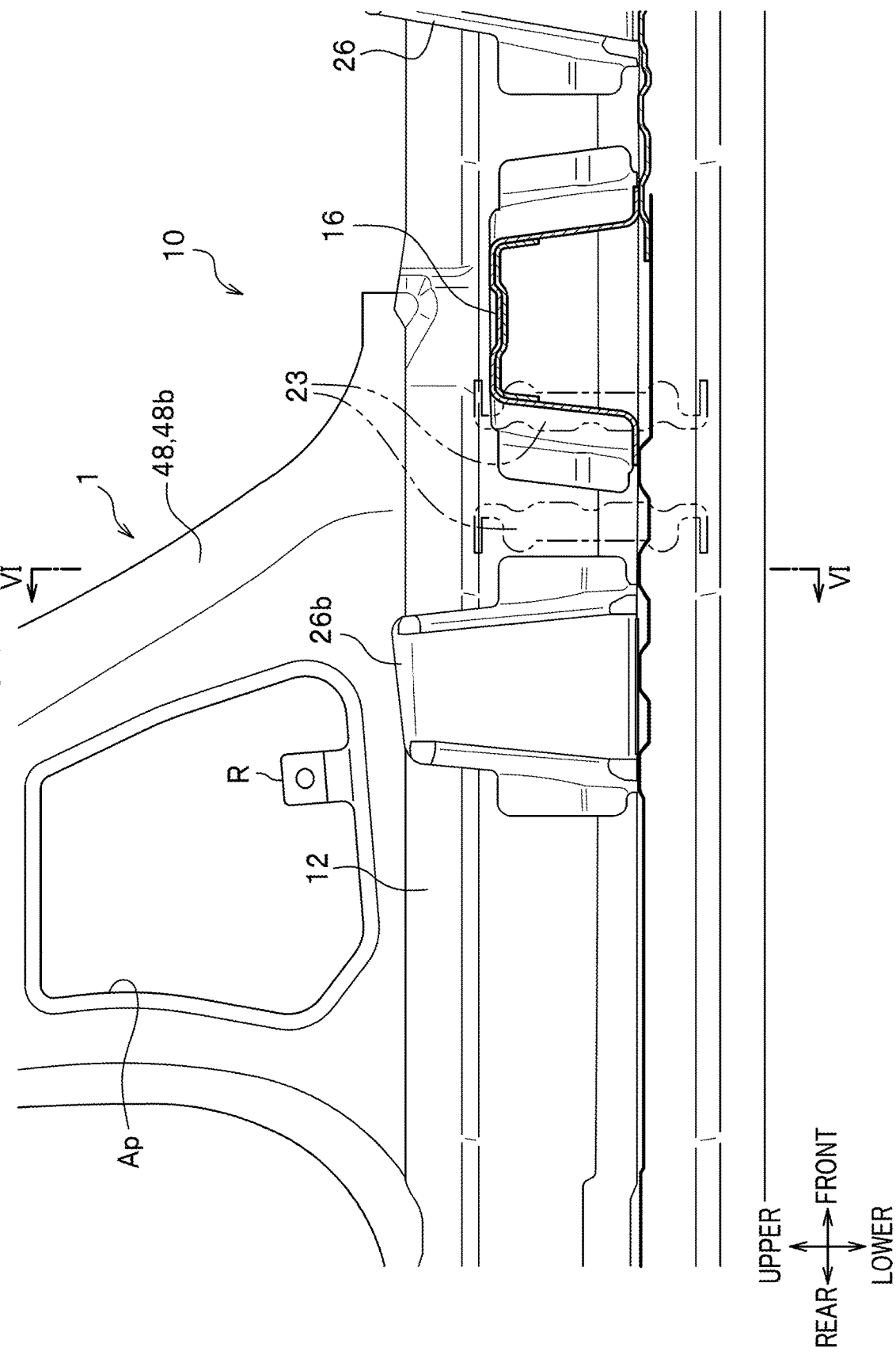
FIG. 5 is an in-vehicle side view on the left side including a V-V cross section of FIG. 3.

FIG. 5 is an in-vehicle side view on the left side including a V-V cross section of FIG. 3. Note that in FIG. 5, the first bulkhead 23 is indicated by using a hidden outline (dotted line). In addition, in FIG. 5, reference sign 16 indicates the floor cross member, reference sign 48*b* indicates the pillar inner of the center pillar 40, and reference sign 26 indicates the second seat bracket. Reference sign Ap indicates the aperture formed in the pillar inner 48*b*.

As shown in FIG. 5, the first bulkhead 23 is arranged at a position overlapping the floor cross member 16 in the vehicle body front-rear direction.

As shown in FIG. 3, the first bulkhead 23 is arranged side by side with the lower end portion (insertion portion 38) of the stiffener 48*a* in the vehicle-width direction, and the partition wall 23*a* partitions a space formed between the side sill inner 12*b* and the lower end portion of the stiffener 48*a* in the front-rear direction.

On the other hand, as shown in FIG. 4, the aforementioned second bulkhead 24 is arranged at a lower end of a hollow portion formed by the pillar inner 48*b* and the stiffener 48*a* of the center pillar 48 obliquely above and behind the first bulkhead 23. Specifically, the second bulkhead 24 is arranged in such a manner as to partition the hollow portion of the center pillar 48, which extends upward of the side sill 12, and the hollow portion of the side sill 12. As described above, the flange F9 of the second bulkhead 24 is joined together with the lower end portion of the pillar inner 48*b* and the flange F4 on the upper side of the side sill inner 12*b* in three layers by spot welding or the like.

In addition, as described above, the flange F10 of the second bulkhead 24 is joined together with the flange F6 of the side sill stiffener 12*a* and the stiffener 48*a* in three layers by spot welding or the like.

That is, the second bulkhead 24 is coupled with the inner side face in the vehicle-width direction of the insertion portion 38 of the stiffener 48*a*. In addition, the end portion of the second bulkhead 24 on the outer side in the vehicle-width direction is joined to the side sill stiffener 12*a* with the stiffener 48*a* interposed in between. In addition, the end portion of the second bulkhead 24 on the inner side in the vehicle-width direction is joined to the side sill inner 12*b* with the pillar inner 48*b* interposed in between.

As shown in FIG. 4, the second bulkhead 24 is arranged at a position overlapping the second seat brackets 26 in the vehicle body front-rear direction.

In addition, as shown in FIG. 4, the aperture Ap for a later-described seat belt locking device 5 (see FIG. 6), which faces inside the cross section of the center pillar 48, is formed in the pillar inner 48*b* immediately above the flange F9 of this second bulkhead 24.

As shown in FIG. 5, the aperture Ap has a substantially trapezoidal shape in conformity to the flat shape of the pillar inner 48*b* which becomes wider as extending downward.

In FIG. 5, reference sign R indicates a fixation rib for the seat belt locking device 5 (see FIG. 6) in the pillar inner 48*b*.

Figure 6:
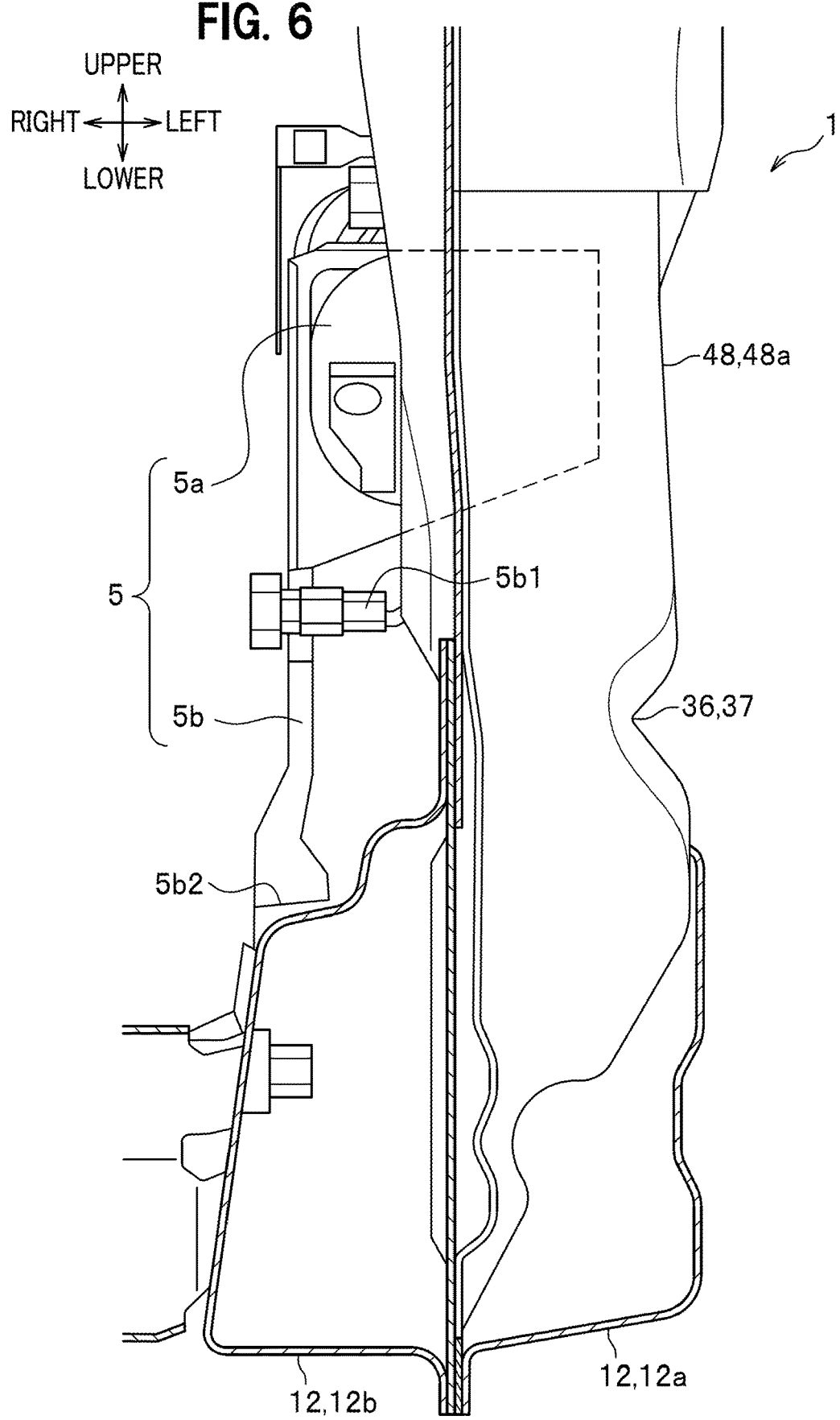
FIG. 6 is a front view of the vehicle body side structure including a VI-VI cross section of FIG. 5 and showing the state of a seat belt locking device attached to an aperture formed in the center pillar.

FIG. 6 is a front view of the vehicle body side structure 1 including a VI-VI cross section of FIG. 5 and showing the state of the seat belt locking device 5 attached to the aperture Ap of the pillar inner 48*b* shown in FIG. 5.

As shown in FIG. 6, the seat belt locking device 5 is arranged partially inside the cross section of the center pillar 48 as indicated by using a hidden outline (dotted line) in FIG. 6.

Specifically, the seat belt locking device 5 includes a main body part 5*a*, which is arranged partially inside the cross section of the center pillar 48, and a supporting part 5*b*, which supports the main body part 5*a* on the pillar inner 48*b* and the side sill inner 12*b*.

The main body part 5*a* is a winding device (ELR: Emergency Locking Retractor) for a webbing (not shown), which is a lap belt. This winding device is configured such that when putting the lap belt on, the occupant can easily pull out the webbing, and in the case where large acceleration is generated in pulling out of the webbing, the winding device locks the webbing. Note that although not shown, the webbing pulled out from the upper portion of the main body part 5*a* extends to the vehicle inner side through a slit hole provided in an upper portion of a pillar garnish inner, which covers this seat belt locking device 5 from the vehicle inner side, and the front end portion of the webbing with a ring member is fixed to an anchor plate of the floor panel on the vehicle outer side of the passenger's seat.

As shown in FIG. 6, such a main body part 5*a* is arranged above the bead portion 36 (fragile portion 37) formed in the stiffener 48*a*.

As shown in FIG. 6, the supporting part 5*b* includes an upper locking portion 5*b*1, which is connected to the lower portion of the main body part 5*a* on the vehicle inner side and is locked with the fixation rib R (see FIG. 5) formed in the aperture Ap (see FIG. 5) of the stiffener 48*a*, and a lower locking portion 5*b*2, which extends downward from this upper locking portion 5*b*1 and is locked with the upper face of the side sill inner 12*b*.

<<Operations and Effects>>

Hereinafter, the operations and effects exhibited by the vehicle body side structure 1 according to the present embodiment are described.

First, the basic operation of the vehicle body side structure 1 at the time of side collision is described with reference to the drawings.

Figure 7A:
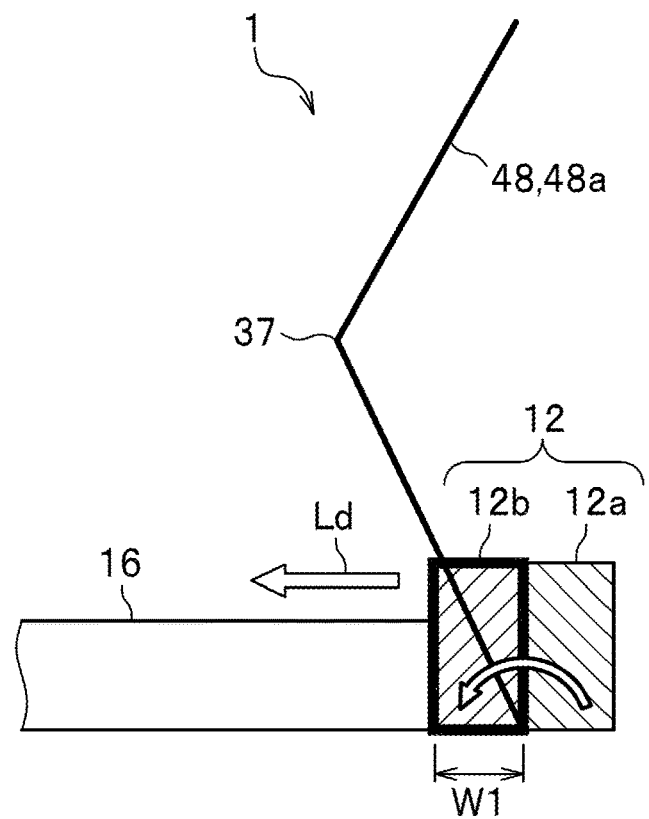
FIG. 7A is an operation explanatory diagram of the vehicle body side structure according to the embodiment of the present invention at the time of side collision.
Figure 7B:
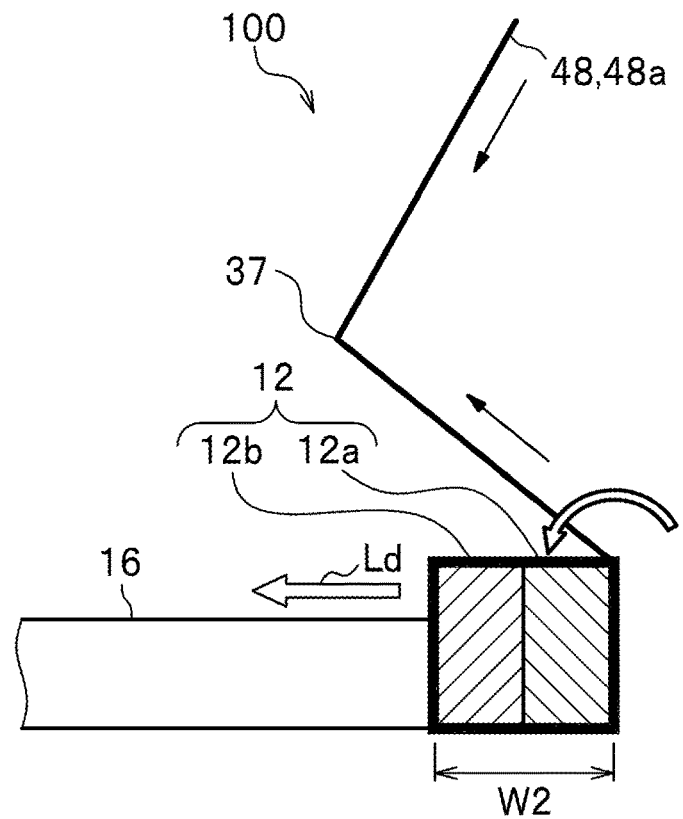
FIG. 7B is an operation explanatory diagram of a vehicle body side structure according to Comparative Example at the time of side collision.

FIG. 7A is an operation explanatory diagram of the vehicle body side structure 1 at the time of side collision, and FIG. 7B is an operation explanatory diagram of a vehicle body side structure 100 according to Comparative Example.

As shown in FIG. 7A, the stiffener 48*a* of the center pillar 48 in the vehicle body side structure 1 is arranged inside the hollow cross section of the side sill 12, and has the lower end portion held between the side sill inner 12*b* and the side sill stiffener 12*a*. Note that in FIG. 7A, the description of the pillar inner 48*b* (see FIG. 2) of the center pillar 48 is omitted.

As shown in FIG. 7B, the lower end portion of the stiffener 48*a* of the vehicle body side structure 100 according to Comparative Example is fixed to the upper portion of the side sill 12 on the vehicle outer side (on the right side of the sheet surface of FIG. 7B).

Note that in FIG. 7A and FIG. 7B, reference sign 16 indicates the floor cross member, reference sign 37 indicates the fragile portion of the stiffener 48*a*, and reference sign Ld indicates side collision load.

As shown in FIG. 7B, once the side collision load Ld is inputted to the vehicle body side structure 100 according to Comparative Example from the vehicle outer side, part of the side collision load Ld is transmitted to the floor cross member 16 through the side sill 12. On the other hand, when the stiffener 48*a* is bent to the vehicle inner side from the fragile portion 37 by the side collision load Ld, the stiffener 48*a* turns about the fixation point between the lower end portion of the stiffener 48*a* and the side sill 12.

The vehicle body side structure 100 according to Comparative Example absorbs part of the side collision load Ld by causing the stiffener 48a to be bent and deformed.

However, the turning of the stiffener 48a about the aforementioned fixation portion suppresses the deformation of the side sill 12. Hence, the vehicle body side structure 100 is such that absorption of the side collision load Ld by the deformation of the side sill 12 becomes insufficient.

In contrast, in the vehicle body side structure 1 according to the present embodiment, as shown in FIG. 7A, when the stiffener 48a is bent to the vehicle inner side from the fragile portion 37 by the input of the side collision load Ld, the lower end portion of the stiffener 48a inserted in the cross section of the side sill 12 turns in such a manner as to crush the side sill inner 12b.

In this way, the vehicle body side structure 1 according to the present embodiment absorbs the side collision load Ld by using the bending deformation of the stiffener 48a and the crushing of the side sill 12.

Such a vehicle body side structure 1 is more excellent in performance of absorbing the side collision load Ld than the vehicle body side structure 100.

In addition, since such a vehicle body side structure 1 absorbs the side collision load Ld by using also the crushing of the side sill 12 when the side collision load Ld having the same magnitude as in the case of the vehicle body side structure 100 according to Comparative Example is inputted, it is possible to reduce the amount of deformation of the stiffener 48a to the vehicle inner side due to the side collision load Ld.

In addition, the vehicle body side structure 1 makes it possible to reduce the effective cross-sectional area of the side sill 12 depending on the amount of crushing of the side sill 12 due to the side collision load Ld. This enables the vehicle body side structure 1 to achieve reduction in weight of the side sill 12.

In addition, as shown in FIG. 7A and FIG. 7B, the distance W1 between the floor cross member 16 and the fixation portion of the stiffener 48a to the side sill 12 in the vehicle-width direction in the vehicle body side structure 1 according to the present embodiment is shorter than the corresponding distance W2 of the vehicle body side structure 100 according to Comparative Example. That is, in the vehicle body side structure 1 according to the present embodiment, the distance from the rotation axis of moment applied to the side sill 12 becomes shorter than that in the vehicle body side structure 100 according to Comparative Example. This enables the vehicle body side structure 1 according to the present embodiment to have a further improved bearing strength at the time of side collision as compared with conventional structures such as the vehicle body side structure 100 according to Comparative Example, even without providing a separate reinforcement member to the side sill 12.

In addition, in the vehicle body side structure 1 according to the present embodiment, it is possible to change the amount of absorption of the side collision load Ld by changing the height of the fragile portion 37 from the side sill 12.

FIG. 7C is an operation explanatory diagram of the vehicle body side structure 1 according to the present embodiment in conformity to the height of the fragile portion 37.

In a vehicle body side structure 1 shown in the upper stage of FIG. 7C, the height of the fragile portion 37 from the side sill 12 is H2. In a vehicle body side structure 1 shown in the lower stage of FIG. 7C, the height H1 of the fragile portion 37 from the side sill 12 is lower than the height H2 in the vehicle body side structure 1 in the upper part.

In these vehicle body side structures 1 in the upper and lower stages, in the case where the amount of the stiffener 48a entering the vehicle inner side at the time of side collision indicated by imaginary lines (dashed-two dotted lines) in FIG. 7C is assumed to be constant, the amounts of crushing of the side sill 12 in the respective cases can be compared in accordance with the areas of the triangle T1 and the triangle T2 in FIG. 7C.

That is, in the vehicle body side structure 1 according to the present embodiment, as the height of the fragile portion 37 from the side sill 12 is reduced, the amount of absorption of the side collision load Ld increases.

Next, the operations and effects exhibited by the vehicle body side structure 1 are described in further detail.

According to the vehicle body side structure 1 of the present embodiment, the stiffener 48a having a protruding shape is inserted inside the cross section of the side sill 12, and includes the fragile portion 37 above the side sill 12. This makes it possible to bend the center pillar 48 to the vehicle inner side on the lower side, and to deform the center pillar 48 in such a manner as to crush the side sill 12 to the vehicle inner side at the time of side collision.

Hence, the vehicle body side structure 1 is capable of sufficiently absorbing side collision load by using deformation (crushing) of the side sill 12 in addition to the deformation of the center pillar 48 while suppressing deformation of the center pillar 48 to the vehicle inner side. Specifically, in the vehicle body side structure 1, the protruding portion (bulging portion 49) of the stiffener 48a inserted in the cross section of the side sill 12 deforms the side sill 12, and also the lower side of the center pillar 48 is bent from the fragile portion 37 of the center pillar 48, so that the amount of deformation of the side sill 12 is increased.

In addition, the vehicle body side structure 1 according to the present embodiment makes it possible to surely cause the bending of the lower end portion of the center pillar 48 by arranging the fragile portion 37 between the side sill 12 and the seat belt locking device 5 (main body part 5a). The center pillar 48 can surely deform the side sill 12. This enables the vehicle body side structure 1 to sufficiently absorb side collision load by using the deformation of the side sill 12 in addition to the deformation of the center pillar 48 while more securely suppressing the deformation of the center pillar 48 to the vehicle inner side.

In addition, the vehicle body side structure 1 according to the present embodiment makes it possible to securely bend the center pillar 48 at the fragile portion 37 by forming the fragile portion 37 of the bead portion 36. The center pillar 48 can further securely deform the side sill 12. This enables the vehicle body side structure 1 to sufficiently absorb side collision load while further securely suppressing the deformation of the center pillar 48 to the vehicle inner side.

In addition, in the vehicle body side structure 1 according to the present embodiment, the insertion portion 38 of the stiffener 48a in the center pillar 48 is arranged at a position overlapping the floor cross member 16 in the vehicle body front-rear direction, which suppresses deformation of the side sill 12 inward in the vehicle-width direction when the center pillar 48 is deformed. This enables the vehicle body side structure 1 to surely crush the side sill 12. The vehicle body side structure 1 can sufficiently absorb side collision load without increasing the amount of deformation of the center pillar 48 to the vehicle inner side.

In addition, the vehicle body side structure 1 according to the present embodiment includes the first bulkhead 23 on the side sill inner 12*b* side, which makes it possible to improve the rigidity of the side sill 12 inward in the vehicle-width direction (the direction of deformation of the center pillar 48). This enables the vehicle body side structure 1 to increase the amount of absorption of side collision load by using the deformation of the side sill 12. In addition, since the first bulkhead 23 is arranged at the end portion of the insertion portion 38 of the stiffener 48*a* in the vehicle body front-rear direction, it is possible transmit side collision load from the center pillar 48 to the floor cross member 16 through the first bulkhead 23.

In addition, the vehicle body side structure 1 according to the present embodiment includes the second bulkhead 24, which makes it possible to reinforce the hollow cross section of the center pillar 48 in the vicinity of the insertion portion 38 of the center pillar 48. This enables the vehicle body side structure 1 to prevent the hollow cross section of the center pillar 48 from being crushed in the vicinity of the insertion portion 38 when side collision load is inputted. This enables the vehicle body side structure 1 to surely crush the side sill inner 12*b*. In addition, in the case where excessive load is inputted to the center pillar 48, the cross section of the center pillar 48 in the vicinity of the insertion portion 38 reinforced with the second bulkhead 24 is crushed after the side sill inner 12*b* is crushed. This enables the vehicle body side structure 1 to efficiently increase the amount of absorption of side collision load.

In addition, in the vehicle body side structure 1 according to the present embodiment, the second seat brackets 26 is arranged at a position overlapping the second bulkhead 24 in the vehicle body front-rear direction, which suppresses the deformation of the side sill 12 inward in the vehicle-width direction when the center pillar 48 is deformed. This enables the vehicle body side structure 1 to more surely crush the side sill 12. The vehicle body side structure 1 can absorb side collision load without increasing the amount of deformation of the center pillar 48.

In addition, in the vehicle body side structure 1 according to the present embodiment, the second seat brackets 26 and the floor cross member 16 are coupled with the floor frame 52 interposed in between, which makes it possible to further improve the rigidity on the vehicle inner side relative to the side sill 12. This enables the vehicle body side structure 1 to further surely deform the side sill 12.

The present embodiment has been described so far; however, the present invention is not limited to the above-described embodiment, and can be implemented in various modes.

What is claimed is:

1. A vehicle body side structure in which a pillar which extends upward from a side sill having a hollow cross section forms a closed cross section with a pillar inner thereof and a stiffener joined to an outer side in a vehicle-width direction of the pillar inner, and the stiffener has a protruding shape which protrudes outward in the vehicle-width direction, wherein
the stiffener has an insertion portion into a cross section of the side sill, and has a fragile portion above the side sill, and
the insertion portion inserted into the cross section of the side sill is arranged at a position overlapping a floor cross member which extends inward in the vehicle-width direction from the side sill in the vehicle body front-rear direction.

2. The vehicle body side structure according to claim 1, wherein a seat belt locking device is arranged inside the cross section of the pillar, and
the fragile portion is formed between the side sill and the seat belt locking device.

3. The vehicle body side structure according to claim 2, wherein
the fragile portion is formed of a bead portion which extends in a vehicle body front-rear direction.

4. The vehicle body side structure according to claim 1, wherein
the side sill includes:
a side sill inner;
a side sill stiffener which is arranged outside the side sill inner in the vehicle-width direction and into which the stiffener is inserted; and
a first bulkhead which is arranged on the side sill inner side in the cross section of the side sill and at a position overlapping an end portion in the vehicle body front-rear direction of the insertion portion in the vehicle body front-rear direction.

5. The vehicle body side structure according to claim 4, further comprising:
a second bulkhead which is different from the first bulkhead and which couples an inner side face in the vehicle-width direction of the insertion portion and the side sill inner, wherein
an end portion of the second bulkhead on an outer side in the vehicle-width direction is joined to the side sill stiffener with the stiffener interposed in between, and
an end portion of the second bulkhead on an inner side in the vehicle-width direction is joined to the side sill inner with the pillar inner interposed in between.

6. The vehicle body side structure according to claim 5, further comprising:
a seat bracket on an inner side in the vehicle-width direction relative to the side sill, and
the seat bracket is arranged at a position overlapping the second bulkhead in the vehicle body front-rear direction.

7. The vehicle body side structure according to claim 6, wherein
the seat bracket is coupled to the floor cross member with a floor frame interposed in between which extends in the vehicle body front-rear direction on the lower face side of the floor panel.

8. A vehicle body side structure in which a pillar which extends upward from a side sill having a hollow cross section forms a closed cross section with a pillar inner thereof and a stiffener joined to an outer side in a vehicle-width direction of the pillar inner, and the stiffener has a protruding shape which protrudes outward in the vehicle-width direction, wherein
the stiffener has an insertion portion into a cross section of the side sill, and has a fragile portion above the side sill,
a seat belt locking device is arranged inside the cross section of the pillar, and
the fragile portion is formed between the side sill and the seat belt locking device.

9. The vehicle body side structure according to claim 8, wherein
the fragile portion is formed of a bead portion which extends in a vehicle body front-rear direction.

10. A vehicle body side structure in which a center pillar which extends upward from a side sill having a hollow cross section forms a closed cross section with a pillar inner thereof and a stiffener joined to an outer side in a vehicle-width direction of the pillar inner, and the stiffener has a protruding shape which protrudes outward in the vehicle-width direction, wherein
the stiffener has an insertion portion into a cross section of the side sill, and has a fragile portion above the side sill.

11. The vehicle body side structure according to claim 10, wherein
a seat belt locking device is arranged inside the cross section of the center pillar, and
the fragile portion is formed between the side sill and the seat belt locking device.

12. The vehicle body side structure according to claim 11, wherein
the fragile portion is formed of a bead portion which extends in a vehicle body front-rear direction.

13. The vehicle body side structure according to claim 10, wherein
the insertion portion inserted into the cross section of the side sill is arranged at a position overlapping a floor cross member which extends inward in the vehicle-width direction from the side sill in the vehicle body front-rear direction.

14. The vehicle body side structure according to claim 13, wherein
the side sill includes:
a side sill inner;
a side sill stiffener which is arranged outside the side sill inner in the vehicle-width direction and into which the stiffener is inserted; and
a first bulkhead which is arranged on the side sill inner side in the cross section of the side sill and at a position overlapping an end portion in the vehicle body front-rear direction of the insertion portion in the vehicle body front-rear direction.

15. The vehicle body side structure according to claim 14, further comprising:
a second bulkhead which is different from the first bulkhead and which couples an inner side face in the vehicle-width direction of the insertion portion and the side sill inner, wherein
an end portion of the second bulkhead on an outer side in the vehicle-width direction is joined to the side sill stiffener with the stiffener interposed in between, and
an end portion of the second bulkhead on an inner side in the vehicle-width direction is joined to the side sill inner with the pillar inner interposed in between.

16. The vehicle body side structure according to claim 15, further comprising:
a seat bracket on an inner side in the vehicle-width direction relative to the side sill, and
the seat bracket is arranged at a position overlapping the second bulkhead in the vehicle body front-rear direction.

17. The vehicle body side structure according to claim 16, wherein
the seat bracket is coupled to the floor cross member with a floor frame interposed in between which extends in the vehicle body front-rear direction on the lower face side of the floor panel.

* * * * *